US012707531B2

(12) United States Patent
Liang et al.

(10) Patent No.: US 12,707,531 B2
(45) Date of Patent: Aug. 11, 2026

(54) TIMER CONTROL METHOD AND APPARATUS, AND TERMINAL

(71) Applicant: VIVO MOBILE COMMUNICATION CO., LTD., Dongguan (CN)

(72) Inventors: Jing Liang, Dongguan (CN); Qian Zheng, Dongguan (CN); Siqi Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 337 days.

(21) Appl. No.: 18/368,807

(22) Filed: Sep. 15, 2023

(65) Prior Publication Data

US 2024/0008141 A1 Jan. 4, 2024

Related U.S. Application Data

(63) Continuation of application No. PCT/CN2022/080879, filed on Mar. 15, 2022.

(30) Foreign Application Priority Data

Mar. 17, 2021 (CN) ......................... 202110286570.1

(51) Int. Cl.
*H04W 76/28* (2018.01)
*H04L 1/1867* (2023.01)
*H04W 72/25* (2023.01)

(52) U.S. Cl.
CPC ........... *H04W 76/28* (2018.02); *H04L 1/1867* (2013.01); *H04W 72/25* (2023.01)

(58) Field of Classification Search
None
See application file for complete search history.

(56) References Cited

U.S. PATENT DOCUMENTS

2019/0364492 A1 11/2019 Azizi et al.
2020/0344722 A1 10/2020 He et al.
2020/0396734 A1 12/2020 Li et al.
2021/0211239 A1 7/2021 Fan et al.
(Continued)

FOREIGN PATENT DOCUMENTS

CN 110912653 A 3/2020
CN 111107563 A 5/2020
(Continued)

OTHER PUBLICATIONS

Intel Corporation, "Summary of AI 7.2.4.2.2 Mode-2 Resource Allocation", 3GPP TSG RAN WG1 Meeting #97, Reno, US, May 13-17, 2019, R1-1907699.
(Continued)

*Primary Examiner* — Walter J Divito
(74) *Attorney, Agent, or Firm* — The Webb Law Firm

(57) ABSTRACT

A timer control method includes in a case of an occasion for determining that target feedback information needs to be transmitted to a second terminal and the target feedback information being unable to be transmitted through a target PSFCH, starting or prohibiting, by a first terminal, a first timer; where in a running duration of the first timer, the first terminal does not need to monitor control signaling and/or data from the second terminal; and the first terminal communicates with the second terminal through a sidelink.

15 Claims, 6 Drawing Sheets

(56) References Cited

U.S. PATENT DOCUMENTS

| | | | | |
|---|---|---|---|---|
| 2021/0218509 | A1 | 7/2021 | Wu et al. | |
| 2021/0250960 | A1 | 8/2021 | Yang | |
| 2022/0104126 | A1* | 3/2022 | Lee | H04W 52/0219 |
| 2022/0174695 | A1 | 6/2022 | Lee et al. | |
| 2022/0174780 | A1 | 6/2022 | Bao et al. | |
| 2022/0174781 | A1 | 6/2022 | Yang et al. | |
| 2022/0183103 | A1 | 6/2022 | Bao et al. | |
| 2022/0191851 | A1* | 6/2022 | Park | H04W 92/18 |
| 2022/0225469 | A1* | 7/2022 | Lee | H04L 1/1812 |
| 2022/0264646 | A1* | 8/2022 | Wang | H04W 74/0866 |
| 2022/0312241 | A1 | 9/2022 | Xu et al. | |
| 2023/0164696 | A1 | 5/2023 | Yang | |
| 2023/0209576 | A1* | 6/2023 | Hwang | H04W 8/26 370/329 |
| 2023/0284245 | A1 | 9/2023 | Zhao | |
| 2023/0354469 | A1* | 11/2023 | Ji | H04L 1/1822 |

FOREIGN PATENT DOCUMENTS

| | | | |
|---|---|---|---|
| CN | 111556590 | A | 8/2020 |
| CN | 111567070 | A | 8/2020 |
| CN | 111800764 | A | 10/2020 |
| CN | 111800893 | A | 10/2020 |
| CN | 111800894 | A | 10/2020 |
| CN | 111865485 | A | 10/2020 |
| CN | 111869245 | A | 10/2020 |
| CN | 112399644 | A | 2/2021 |
| EP | 3855811 | A1 | 7/2021 |
| EP | 3876614 | A1 | 9/2021 |
| KR | 1020180102121 | A | 9/2018 |
| KR | 1020200035836 | A | 4/2020 |
| KR | 1020210027067 | A | 3/2021 |
| WO | 2020204567 | A1 | 10/2020 |
| WO | 2020251734 | A1 | 12/2020 |
| WO | 2021031826 | A1 | 2/2021 |

OTHER PUBLICATIONS

Interdigital Inc., "Definition of the Active Time in SL DRX", 3GPP RAN WG2 Meeting #113 electronic, Online, Jan. 2021, R2-2100514.

Interdigital Inc., "Discussion of Uu DRX for SL UE", 3GPP RAN WG2 Meeting #113 electronic, Online, Jan. 2021, R2-2100519.

Ericsson, "Physical layer procedures for sidelink", 3GPP TSG-RAN WG1 Meeting #96bis, Xi'an, China, Apr. 8-12, 2019, R1-1905480.

Huawei et al., "Remaining issues on HARQ operation for NR SL", 3GPP TSG-RAN WG2 Meeting #109 electronic, Feb. 24-Mar. 6, 2020, R2-2001416.

Huawei et al., "General aspects of SL DRX for unicast", 3GPP TSG-RAN WG2 Meeting #113-e, Electronic, Jan. 25-Feb. 5, 2021, R2-2101725.

Intel Corporation, "Sidelink physical layer procedures for NR V2X communication", 3GPP TSG-RAN WG1 Meeting #98bis, Chongqing, China, Oct. 14-20, 2019, R1-1910653.

LG Electronics, "Discussion on essential corrections in physical layer procedures", 3GPP TSG-RAN WG1 Meeting #102-e, e-Meeting, Aug. 1-28, 2020, R1-2005745.

Mediatek Inc., "Discussion on NR V2X unicast, groupcast related requirement", 3GPP TSG-RAN WG4 Meeting #94-e, Electronic Meeting, Feb. 24-Mar. 6, 2020, R4-2001030.

Qualcomm Incorporated, "PFSCH MPR", 3GPP TSG-RAN 4 #93, Reno, US, Nov. 18-22, 2019, R4-1915989.

Samsung, "On Physical layer procedure for NR sidelink", 3GPP TSG RAN WG1 #100bis, e-Meeting, Apr. 20-30, 2020, R1-2002129.

Vivo, "Phyiscal layer procedure for NR sidelink", 3GPP TSG RAN WG1 Meeting #99, Reno, US, Nov. 18-22, 2019, R1-1912026.

ETSI, "5G; NR; Medium Access Control (MAC) protocol specification", ETSI TS 138 321 V16.5.0 (Sep. 2021); 3GPP TS 38.321 version 16.5.0 Release 16.

* cited by examiner

TIMER CONTROL METHOD AND APPARATUS, AND TERMINAL

CROSS-REFERENCE TO RELATED APPLICATIONS

The present application is a Bypass Continuation application of International Patent Application No. PCT/CN2022/080879 filed Mar. 15, 2022, and claims priority to Chinese Patent Application No. 202110286570.1 filed Mar. 17, 2021, the disclosures of which are hereby incorporated by reference in their entireties.

BACKGROUND OF THE INVENTION

Field of the Invention

This application pertains to the field of wireless communication technologies and relates to a timer control method and apparatus, and a terminal.

Description of Related Art

Starting from Release 12, a long term evolution (LTE) system supports a sidelink for direct data transmission between terminals (UE) without using a network device.

SUMMARY OF THE INVENTION

Embodiments of this application provide a timer control method and apparatus, and a terminal.

According to a first aspect, a timer control method is provided, including: in a case of an occasion for determining that target feedback information needs to be transmitted to a second terminal and the target feedback information being unable to be transmitted through a target physical sidelink feedback channel PSFCH, starting, by a first terminal, a first timer; where in a running duration of the first timer, the first terminal does not need to monitor control signaling and/or data from the second terminal; and the first terminal communicates with the second terminal through a sidelink.

According to a second aspect, a timer control method is provided, including: in a case of an occasion for determining that target feedback information needs to be transmitted to a second terminal and the target feedback information being unable to be transmitted through a target physical sidelink feedback channel PSFCH, prohibiting, by a first terminal, starting a first timer; where in a running duration of the first timer, the first terminal does not need to monitor control signaling and/or data from the second terminal; and the first terminal communicates with the second terminal through a sidelink.

According to a third aspect, a data retransmission control method is provided, including: in a case that a second terminal determines that target feedback information of a first terminal is unable to be received through a target PSFCH, determining, by the second terminal, that feedback information of the first terminal is negative-acknowledgement feedback information, where the first terminal communicates with the second terminal through a sidelink; and performing, by the second terminal, retransmission to the first terminal.

According to a fourth aspect, a data retransmission control method is provided, including: in a case that a second terminal determines that target feedback information of a first terminal is unable to be received through a target PSFCH, determining, by the second terminal, that the target feedback information is acknowledgement feedback information, where the first terminal communicates with the second terminal through a sidelink; and determining, by the second terminal, that there is no need to perform retransmission to the first terminal.

According to a fifth aspect, a timer control apparatus is provided, including: a first timer control module configured to: in a case of an occasion for determining that a first terminal needs to transmit target feedback information to a second terminal and the target feedback information being unable to be transmitted through a target physical sidelink feedback channel PSFCH, start a first timer of the first terminal; where in a running duration of the first timer, the first terminal does not need to monitor control signaling and/or data from the second terminal; and the first terminal communicates with the second terminal through a sidelink.

According to a sixth aspect, a timer control apparatus is provided, including: a second timer control module configured to: in a case of an occasion for determining that a first terminal needs to transmit target feedback information to a second terminal and the target feedback information being unable to be transmitted through a target physical sidelink feedback channel PSFCH, prohibit starting a first timer of the first terminal; where in a running duration of the first timer, the first terminal does not need to monitor control signaling and/or data from the second terminal; and the first terminal communicates with the second terminal through a sidelink.

According to a seventh aspect, a data retransmission control apparatus is provided, including: a third determining module configured to: in a case of determining that a second terminal is unable to receive target feedback information of a first terminal through a target PSFCH, determine that feedback information of the first terminal is negative-acknowledgement feedback information, where the first terminal communicates with the second terminal through a sidelink; and a third control module configured to perform retransmission to the first terminal.

According to an eighth aspect, a data retransmission control apparatus is provided, including: a fourth determining module configured to: in a case of determining that a second terminal is unable to receive target feedback information of a first terminal through a target PSFCH, determine that the target feedback information is acknowledgement feedback information, where the first terminal communicates with the second terminal through a sidelink; and a fourth control module configured to determine that there is no need to perform retransmission to the first terminal.

According to a ninth aspect, a terminal is provided. The terminal includes a processor, a memory, and a program or instructions stored in the memory and executable on the processor. When the program or instructions are executed by the processor, the steps of the method according to the first aspect are implemented, or the steps of the method according to the second aspect are implemented, or the steps of the method according to the third aspect are implemented, or the steps of the method according to the fourth aspect are implemented.

According to a tenth aspect, a non-transitory readable storage medium is provided. The non-transitory readable storage medium stores a program or instructions. When the program or instructions are executed by a processor, the steps of the method according to the first aspect are implemented, or the steps of the method according to the second aspect are implemented, or the steps of the method according to the third aspect are implemented, or the steps of the method according to the fourth aspect are implemented.

According to an eleventh aspect, a chip is provided. The chip includes a processor and a communication interface, the communication interface is coupled to the processor, and the processor is configured to run a program or instructions of a terminal to implement the steps of the method according to the first aspect, or the steps of the method according to the second aspect, or the steps of the method according to the third aspect, or the steps of the method according to the fourth aspect.

According to a twelfth aspect, a computer program product is provided. The computer program product is stored in a non-transitory readable storage medium. When the computer program product is executed by a processor, the steps of the method according to the first aspect are implemented, or the steps of the method according to the second aspect are implemented, or the steps of the method according to the third aspect are implemented, or the steps of the method according to the fourth aspect are implemented.

DESCRIPTION OF THE INVENTION

The following clearly describes the technical solutions in the embodiments of this application with reference to the accompanying drawings in the embodiments of this application. Apparently, the described embodiments are some rather than all of the embodiments of this application. All other embodiments obtained by persons of ordinary skill in the art based on the embodiments of this application shall fall within the protection scope of this application.

The terms "first", "second", and the like in the specification and claims of this application are used to distinguish between similar objects rather than to describe a specific order or sequence. It should be understood that the terms used in this way are interchangeable in appropriate circumstances such that the embodiments of this application can be implemented in other orders than the order illustrated or described herein. In addition, objects distinguished by "first" and "second" are generally of a same type, and an object quantity is not limited, for example, there may be one or more first objects. In addition, in the specification and claims, "and/or" indicates at least one of connected objects, and the character "/" generally indicates an "or" relationship between associated objects.

It should be noted that the technologies described in the embodiments of this application are not limited to a long term evolution (LTE)/LTE-advanced (LTE-A) system, but may also be used in other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technologies described herein may be used in the above-mentioned systems and radio technologies as well as other systems and radio technologies. In the following descriptions, a new radio (NR) system is described for an illustrative purpose, and NR terms are used in most of the following descriptions. However, these technologies may also be applied to other applications than an NR system application, for example, the 6th generation (6G) communication system.

Figure 1:
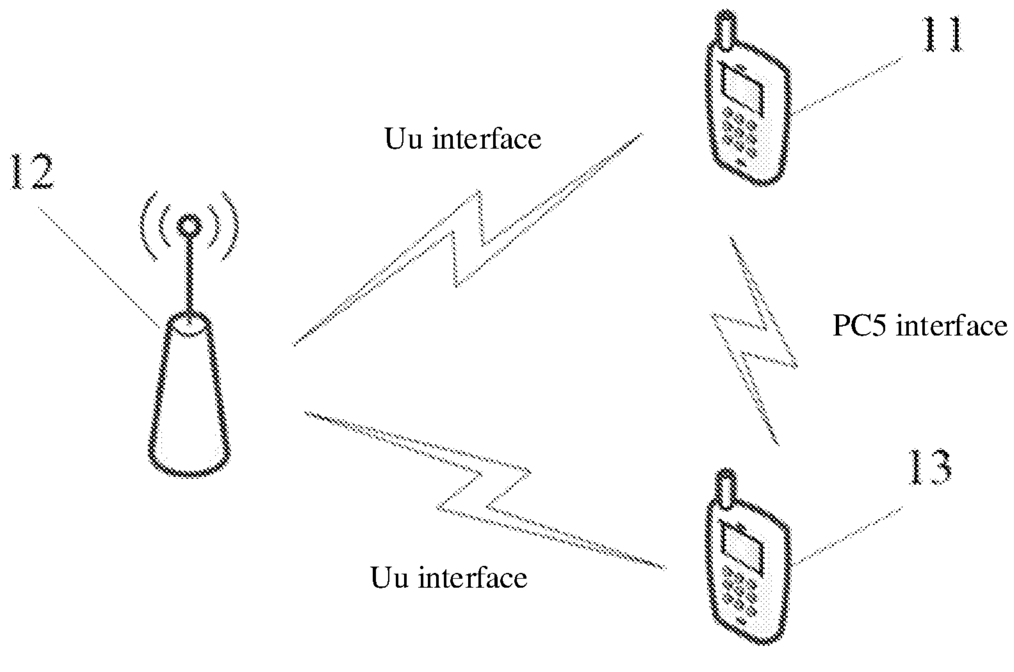
FIG. 1 is a schematic diagram of a wireless communication system to which the embodiments of this application are applicable.

FIG. 1 is a schematic diagram of a wireless communication system to which the embodiments of this application are applicable. The wireless communication system includes a relay terminal (relay UE) 11, a network-side device 12, and a remote terminal (remote UE) 13. In the embodiments of this application, the remote terminal 13 communicates with the relay terminal 11 through a PC5 (sidelink) interface, the relay terminal 11 communicates with the network-side device 12 through a Uu interface, and the remote terminal 13 may also communicate with the network-side device 12 through a Uu interface.

The relay terminal 11 may also be referred to as a relay terminal device or a relay user terminal (UE). The remote terminal 13 may also be referred to as a remote terminal device or remote UE. The relay terminal 11 and the remote terminal 13 may be terminal-side devices such as mobile phones, tablet personal computers, laptop computers or referred to as notebook computers, personal digital assistants (PDA), palmtop computers, netbooks, ultra-mobile personal computers (UMPC), mobile Internet devices (MID), wearable devices or vehicle user equipment (VUE), or pedestrian user equipment (PUE). The wearable device includes a wrist band, earphones, glasses, and the like. It should be noted that specific types of the relay terminal 11 and the remote terminal 13 are not limited in the embodiments of this application. The network-side device 12 may be a base station or a core network, where the base station may be referred to as a NodeB, an evolved NodeB, an access point, a base transceiver station (BTS), a radio base station, a radio transceiver, a basic service set (BSS), an extended service set (ESS), a home NodeB, a home evolved NodeB, a wireless local area network (WLAN) access point, a wireless fidelity (WiFi) node, a transmitting receiving point (TRP), or another appropriate term in the art. As long as a same technical effect is achieved, the base station is not limited to any specific technical term. It should be noted that the base station in the NR system is merely used as an example in the embodiments of this application, and a specific type of the base station is not limited.

Currently, sidelink transmission mainly includes the following transmission modes: broadcast, groupcast, and unicast. Hybrid automatic repeat request (HARQ) feedback for sidelink is transmitted and received on a physical sidelink feedback channel (PSFCH).

For the sidelink, to achieve a purpose of power saving, sidelink discontinuous reception (DRX) may be introduced to implement control on monitoring or transmitting a sidelink control channel. However, in some specific scenarios, for example, in a case that transmitting UE cannot receive a feedback or receiving UE cannot transmit a feedback, a HARQ feedback mechanism may be different from a feedback mechanism in Uu. Therefore, how a sidelink DRX configuration is adapted to for correct retransmission is a technical problem to be resolved at present.

The following describes a timer control solution provided in the embodiments of this application by using some embodiments and application scenarios thereof with reference to the accompanying drawings.

An embodiment of this application provides a timer control method, where the method includes:

in a case of an occasion for determining that target feedback information needs to be transmitted to a second terminal and the target feedback information being unable to be transmitted through a target physical sidelink feedback channel PSFCH, starting, by a first terminal, a first timer;

where in a running duration of the first timer, the first terminal does not need to monitor control signaling and/or data from the second terminal; and the first terminal communicates with the second terminal through a sidelink.

To be specific, in this embodiment of this application, at an occasion of which the target feedback information is transmitted to the second terminal, if the target feedback information is unable to be transmitted through the target PSFCH, the first terminal starts the first timer in a processing manner of successfully transmitting negative-acknowledgement feedback information. A start time of the first timer is the same as an original start time for successfully transmitting the negative-acknowledgement feedback information. That is, although the target feedback information is unable to be transmitted in this case, the first timer is started in the manner of successfully transmitting the negative-acknowledgement feedback information, that is, the first timer is started at a predetermined moment after the negative-acknowledgement feedback information is successfully transmitted.

After the first timer is started, in the running duration of the first timer, the first terminal does not need to monitor the control signaling and/or data from the second terminal, thereby reducing power consumption of the first terminal.

In application, in a case that the target feedback information needs to be transmitted to the second terminal, the first terminal may determine whether the target feedback information is unable to be transmitted through the target PSFCH, and start the first timer when determining that the target feedback information is unable to be transmitted through the target PSFCH. Therefore, optionally, the timer control method provided in this embodiment of this application may use the implementation shown in FIG. 2.

Figure 2:
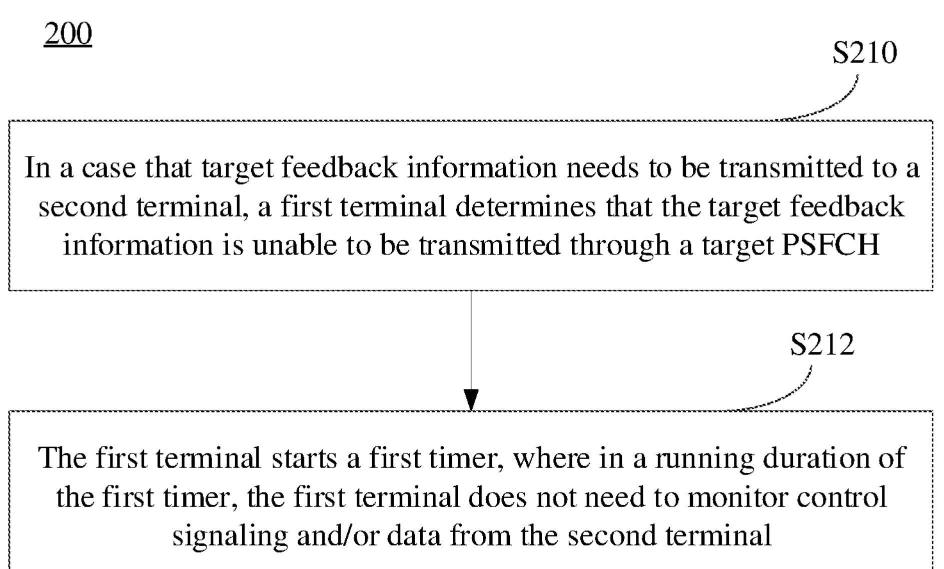
FIG. 2 is a schematic flowchart of a timer control method according to an embodiment of this application.

FIG. 2 is a schematic flowchart of a timer control method according to an embodiment of this application. The method 200 may be performed by a first terminal. In other words, the method may be performed by software or hardware installed on the first terminal. As shown in FIG. 2, the method may include the following steps.

S210: In a case that target feedback information needs to be transmitted to a second terminal, the first terminal determines that the target feedback information is unable to be transmitted through a target PSFCH, where the first terminal communicates with the second terminal through a sidelink.

In this embodiment of this application, the first terminal may be a relay terminal, and the second terminal may be a remote terminal. Alternatively, the first terminal may be a remote terminal, and the second terminal may be a relay terminal.

In this embodiment of this application, the first terminal is a receiving terminal of control signaling and/or data of unicast or groupcast. To be specific, in step S210, after receiving the control signaling and/or data from the second terminal, the first terminal may determine that target feedback information for the control signaling and/or data needs to be transmitted to the second terminal.

In this embodiment of this application, the first terminal determining that the target feedback information is unable to be transmitted through a target PSFCH includes but is not limited to at least one of the following (1) to (5).

(1) Determining that transmission of the target PSFCH conflicts with uplink transmission of the first terminal, where the first terminal is unable to simultaneously perform the transmission of the PSFCH and the uplink transmission, and the uplink transmission is determined to be prioritized according to a predetermined priority rule.

In this embodiment of this application, if the first terminal needs to perform transmission on a sidelink (SL) and perform transmission on an uplink (UL) at the same, priorities of the two transmissions need to be determined. In application, a priority of the first terminal transmitting the PSFCH (namely, the target feedback information) is equal to a highest priority in received associated data (namely, the control signaling and/or data received from the second terminal). In this embodiment of this application, if the uplink transmission is determined to be prioritized according to the predetermined priority rule, the first terminal determines that the target feedback information is unable to be transmitted through the target PSFCH. The predetermined priority rule may be set based on actual application. For example, if a value of a priority of uplink transmission is greater than a threshold 1, and a value of a priority of sidelink transmission is smaller than the threshold 1, the sidelink transmission is determined to be prioritized.

(2) Determining that under an influence of a first factor, transmission through the target PSFCH is unable to be completed. For example, due to limited power of the first terminal, transmission through the target PSFCH is unable to be completed, due to congestion control, transmission through the target PSFCH is unable to be completed, or the like.

(3) Determining that transmission of the target PSFCH is discarded. For example, in a case that the number of PSFCHs that need to be transmitted exceeds a maximum number of PSFCHs that are able to be transmitted by the first terminal, the transmission of the target PSFCH is discarded. Alternatively, in a case that both a PSFCH resource that needs to be transmitted and a PSFCH resource that needs to be received exist on a transmission occasion of the target PSFCH, the first terminal does not have a capability of performing transmission and reception at the same time, and the first terminal determines to receive the target PSFCH, the transmission of the target PSFCH is discarded.

(3) Determining that transmission of the target PSFCH reaches a maximum number of times. After the transmission of the target PSFCH reaches the maximum number of times, transmission is unable to be performed through the target PSFCH. Therefore, the first terminal determines that the target feedback information is unable to be transmitted through the target PSFCH.

(4) Determining that transmission of the target PSFCH does not meet packet delay budget (PDB). Because the transmission of the target PSFCH does not meet the PDB, the first terminal determines that the target feedback information is unable to be transmitted through the target PSFCH.

(5) Determining that a distance between the first terminal and the second terminal exceeds a communication range indicated in sidelink control information (SCI), where communication between the first terminal and the second terminal is groupcast communication. To be specific, the first terminal is a communication member in the groupcast communication, and if the distance between the first terminal and the second terminal exceeds the communication range indicated in the SCI, it is determined that the target feedback information is unable to be transmitted through the target PSFCH.

In this embodiment of this application, the target feedback information may be acknowledgment (ACK) feedback information, or may be negative-acknowledgement (NACK) feedback information. For example, if the first terminal uses a negative-positive acknowledgment feedback manner, the target feedback information may be ACK or NACK. For example, in a case that a data packet is successfully decoded, the first terminal determines that the target feedback information that needs to be transmitted is ACK; and in a case that the data packet fails to be decoded, the first terminal determines that the target feedback information that needs to be transmitted is NACK.

For another example, if the first terminal uses negative-only acknowledgment, the target feedback information is NACK. For example, in a case that a data packet fails to be decoded, the first terminal determines that the target feedback information needs to be transmitted, namely, NACK.

S212: The first terminal starts a first timer, where in a running duration of the first timer, the first terminal does not need to monitor the control signaling and/or data from the second terminal.

In this embodiment of this application, if the first terminal determines that the target feedback information is unable to be transmitted through the target PSFCH, the first terminal considers to restart the first timer regardless of whether target feedback information that is fed back is acknowledgement feedback information or negative-acknowledgement feedback information, that is, the second terminal performs retransmission in this case.

In this embodiment of this application, duration of the first timer may be configured by a network side, for example, configured by a base station, or may be configured by the second terminal, or may be specified by a protocol. This is not specifically limited in the embodiments of this application.

In a possible implementation of this embodiment of this application, the duration of the first timer may be a minimum time gap from a feedback moment of the first terminal transmitting feedback information to reception of retransmission information corresponding to the feedback information.

To be specific, in the foregoing possible implementation, the first timer may be a timer with a function similar to that of drx-HARQ-RTT-Timer of a Uu interface. Therefore, the first timer may also be referred to as drx-HARQ-RTT-TimerSL.

In the foregoing possible implementation, after the first timer expires, the first terminal may start a second timer, where the second timer is used to indicate that the first terminal needs to monitor a physical sidelink control channel (PSCCH) or a physical sidelink shared channel (PSSCH) to monitor retransmission that may be received. To be specific, the second timer may be a timer with a function similar to that of drx-RetransmissionTimer of a Uu interface. Therefore, the second timer may also be referred to as drx-RetransmissionTimerSL.

In a possible implementation, the first terminal may be further provided with a third timer, where the third timer may be started when SCI is received and the SCI indicates new sidelink transmission, to indicate that the first terminal remains in an active state in a running duration of the third timer. To be specific, the third timer may be a timer with a function similar to that of drx-InactivityTimer of a Uu interface. Therefore, the third timer may also be referred to as drx-InactivityTimerSL.

In the foregoing technical solution provided in this embodiment of this application, in a case that the target feedback information needs to be transmitted to the second terminal, if the first terminal (namely, a receiving terminal of data or control signaling) determines that the target feedback information is unable to be transmitted through the target PSFCH, the first terminal starts the first timer, where in the running duration of the first timer, the first terminal does not need to monitor the control signaling and/or data from the second terminal. In this way, in a case that the first terminal is unable to transmit a feedback, a start solution of the first timer related to a sidelink DRX configuration is determined, so that a HARQ feedback mechanism can adapt to the sidelink DRX configuration.

The foregoing timer control method provided in this embodiment of this application provides a determination on starting drx-HARQ-RTT-TimerSL by receive (RX) UE of groupcast or unicast when transmission of a physical sidelink feedback channel (PSFCH) cannot be successfully performed.

For example, for the RX UE of the groupcast, if at least one of the following conditions (I) to (III) is met, the UE starts drx-HARQ-RTT-TimerSL at a related moment.

(I) For negative-positive acknowledgment, when the UE needs to transmit a HARQ feedback (which may be ACK or NACK), while related transmission of the PSFCH is in the following cases, drx-HARQ-RTT-TimerSL is still started.

(1) Transmission of the PSFCH conflicts with UL transmission, and the UE cannot simultaneously perform SL transmission and the UL transmission. After a corresponding determination according to a priority comparison rule, it is determined that the UL transmission needs to be prioritized.

(2) Transmission of the PSFCH cannot be completed due to limited power, congestion control, resource unavailability, or another reason.

(3) When the number of PSFCHs that need to be transmitted exceeds the number of PSFCHs that can be transmitted by the RX UE, transmission of the PSFCH is discarded.

(4) On a same PSFCH occasion, the RX UE may have both a PSFCH resource that needs to be transmitted and a PSFCH resource that needs to be received. However, due to a problem of half-duplex of the RX UE (that is, transmission and reception cannot be performed at the same time), reception of the PSFCH is performed and transmission of the PSFCH is discarded.

(5) Transmission of the PSFCH reaches a maximum number of times.

(6) Transmission of the PSFCH reaches or exceeds PDB, that is, the transmission of the PSFCH does not meet the PDB.

(7) A distance between the RX UE and transmit (TX) UE exceeds a communication range requirement indicated in SCI.

(II) For negative-positive acknowledgment, when the UE needs to transmit a HARQ feedback (which may only be NACK), while related transmission of the PSFCH is in the following cases, drx-HARQ-RTT-TimerSL is still started.

(1) Transmission of the PSFCH conflicts with UL transmission, and the UE cannot simultaneously perform SL transmission and the UL transmission. After a corresponding determination according to a priority comparison rule, it is determined that the UL transmission needs to be prioritized.

(2) Transmission of the PSFCH cannot be completed due to limited power, congestion control, resource unavailability, or another reason.

(3) When the number of PSFCHs that need to be transmitted exceeds the number of PSFCHs that can be transmitted by the RX UE, transmission of the PSFCH is discarded.

(4) On a same PSFCH occasion, the RX UE may have both a PSFCH resource that needs to be transmitted and a PSFCH resource that needs to be received. However, due to a problem of half-duplex of the RX UE (that is, transmission and reception cannot be performed at the same time), reception of the PSFCH is performed and transmission of the PSFCH is discarded.

(5) Transmission of the PSFCH reaches a maximum number of times.

(6) Transmission of the PSFCH reaches or exceeds PDB, that is, the transmission of the PSFCH does not meet the PDB.

(7) A distance between the RX UE and TX UE exceeds a communication range requirement indicated in SCI.

(III) For negative-only acknowledgement, when a data packet fails to be decoded and a HARQ feedback (NACK) needs to be transmitted, while related transmission of the PSFCH is in the following cases, drx-HARQ-RTT-TimerSL is still started.

(1) Transmission of the PSFCH conflicts with UL transmission, and the UE cannot simultaneously perform SL transmission and the UL transmission. After a corresponding determination according to a priority comparison rule, it is determined that the UL transmission needs to be prioritized.

(2) Transmission of the PSFCH cannot be completed due to limited power, congestion control, resource unavailability, or another reason.

(3) When the number of PSFCHs that need to be transmitted exceeds the number of PSFCHs that can be transmitted by the RX UE, transmission of the PSFCH is discarded.

(4) On a same PSFCH occasion, the RX UE may have both a PSFCH resource that needs to be transmitted and a PSFCH resource that needs to be received. However, due to a problem of half-duplex of the RX UE (that is, transmission and reception cannot be performed at the same time), reception of the PSFCH is performed and transmission of the PSFCH is discarded.

(5) Transmission of the PSFCH reaches a maximum number of times.

(6) Transmission of the PSFCH reaches or exceeds PDB, that is, the transmission of the PSFCH does not meet the PDB.

(7) A distance between the RX UE and TX UE exceeds a communication range requirement indicated in SCI.

For the RX UE of unicast, a case is the same as the case of negative-positive acknowledgment of groupcast, which is not described herein.

An embodiment of this application further provides another timer control method, where the method includes:

in a case of an occasion for determining that target feedback information needs to be transmitted to a second terminal and the target feedback information being unable to be transmitted through a target PSFCH, prohibiting, by a first terminal, starting a first timer; where in a running duration of the first timer, the first terminal does not need to monitor control signaling and/or data from the second terminal; and the first terminal communicates with the second terminal through a sidelink.

To be specific, in this embodiment of this application, at an occasion of which the target feedback information is transmitted to the second terminal, if the target feedback information is unable to be transmitted through the target PSFCH, the first terminal prohibits starting the first timer in a processing manner of successfully transmitting acknowledgement feedback information. That is, although the target feedback information is unable to be transmitted in this case, process is performed in the manner of successfully transmitting the acknowledgement feedback information.

In application, in a case that the target feedback information needs to be transmitted to the second terminal, the first terminal may determine whether the target feedback information is unable to be transmitted through the target PSFCH, and prohibit starting the first timer when determining that the target feedback information is unable to be transmitted through the target PSFCH. Therefore, optionally, the timer control method provided in this embodiment of this application may use the implementation shown in FIG. 3.

Figure 3:
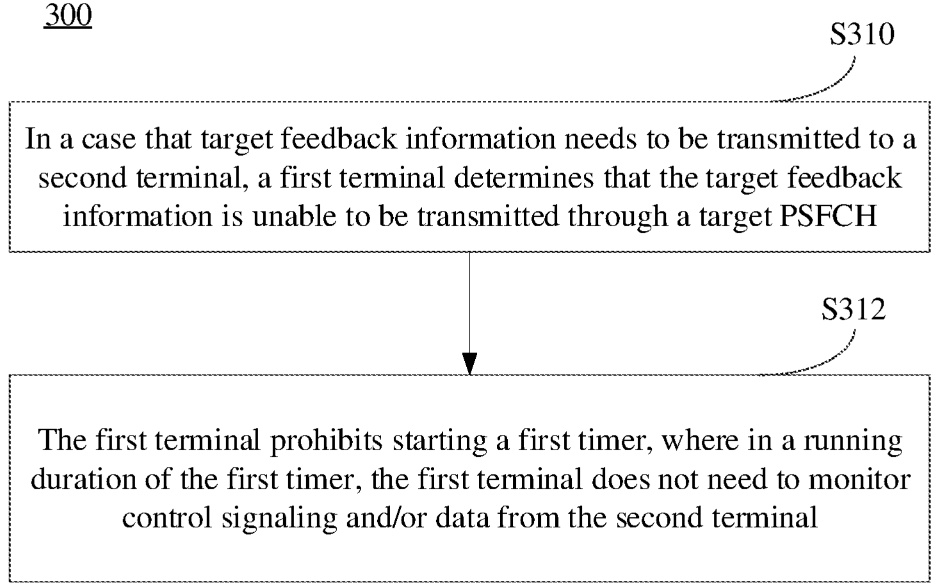
FIG. 3 is another schematic flowchart of a timer control method according to an embodiment of this application.

FIG. 3 is another schematic flowchart of a timer control method according to an embodiment of this application. The method 300 may be performed by a first terminal. In other words, the method may be performed by software or hardware installed on the first terminal. As shown in FIG. 3, the method may include the following steps.

S310: In a case that target feedback information needs to be transmitted to a second terminal, the first terminal determines that the target feedback information is unable to be transmitted through a target PSFCH, where the first terminal communicates with the second terminal through a sidelink.

S310 is the same as S210 in the method 200, and has a same possible implementation. Refer to the related descriptions in the method 200, and details are not described herein again.

S312: The first terminal prohibits starting a first timer, where in a running duration of the first timer, the first terminal does not need to monitor the control signaling and/or data from the second terminal.

The first timer is the same as the first timer in the method 200. Refer to the related descriptions in the method 200, and details are not described herein again.

A difference between S312 and S212 is that the first timer is started in S212, while the first timer is prohibited from starting up in S312. To be specific, in this embodiment, if the first terminal determines that the target feedback information is unable to be transmitted through the target PSFCH, the first terminal considers not to restart the first timer regardless of whether target feedback information that is fed back is acknowledgement feedback information or negative-acknowledgement feedback information, that is, the second terminal does not perform retransmission in this case. In this way, a start solution of the first timer related to a sidelink DRX configuration is determined in a case that the target feedback information is unable to be transmitted through the target PSFCH, so that a HARQ feedback mechanism can adapt to the sidelink DRX configuration.

Figure 4:
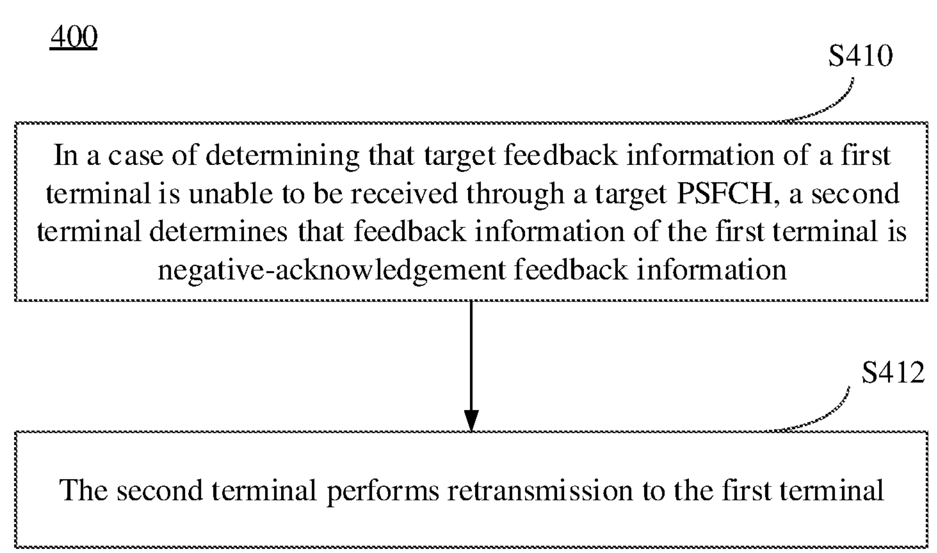
FIG. 4 is a schematic flowchart of a data retransmission control method according to an embodiment of this application.

FIG. 4 is a schematic flowchart of a data retransmission control method according to an embodiment of this application. The method 400 may be performed by a second terminal. In other words, the method may be performed by software or hardware installed on the second terminal. As shown in FIG. 4, the method may include the following steps.

S410: In a case of determining that target feedback information of a first terminal is unable to be received through a target PSFCH, the second terminal determines that feedback information of the first terminal is negative-acknowledgement feedback information, where the first terminal communicates with the second terminal through a sidelink.

In this embodiment of this application, the first terminal may be a relay terminal, and the second terminal may be a remote terminal. Alternatively, the first terminal may be a remote terminal, and the second terminal may be a relay terminal.

In this embodiment of this application, the second terminal is a transmit terminal of control signaling and/or data. To be specific, in step S410, after transmitting the control signaling and/or data to the first terminal, and when it needs to determine that the first terminal transmits target feedback information for the control signaling and/or data to the second terminal, the second terminal may determine whether the target feedback information of the first terminal is unable to be received through the target PSFCH.

In a possible implementation of this embodiment of this application, the second terminal determining that the target feedback information of the first terminal is unable to be received through a target PSFCH includes one of the following (1) to (3).

(1) Determining that reception of the target PSFCH conflicts with uplink transmission of the second terminal, where the second terminal is unable to simultaneously perform the reception of the PSFCH and the uplink transmission, and the uplink transmission is determined to be prioritized according to a predetermined priority rule.

In this embodiment of this application, if the second terminal needs to perform receiving on a sidelink (SL) and perform transmission on an uplink (UL) at the same, priorities of the two transmissions need to be determined. In application, a priority of the second terminal receiving the PSFCH (namely, the target feedback information) is equal to a highest priority in received associated data (namely, the control signaling and/or data transmitted from the second terminal to the first terminal). In this embodiment of this application, if the uplink transmission is determined to be prioritized according to the predetermined priority rule, the second terminal determines that the target feedback information is unable to be transmitted through the target PSFCH. The predetermined priority rule may be set based on actual application. For example, if a value of a priority of uplink transmission is greater than a threshold 1, and a value of a priority of sidelink transmission is smaller than the threshold 1, the sidelink transmission is determined to be prioritized.

(2) Determining that the number of PSFCHs that need to be received exceeds a maximum number of PSFCHs that are able to be received by the second terminal, where reception through the target PSFCH is unable to be performed. To be specific, the number of PSFCHs that need to be received exceeds the maximum number of PSFCHs that are able to be received by the second terminal. Reception of the target PSFCH is discarded, and therefore the reception through the target PSFCH is unable to be performed.

(3) Determining that both a PSFCH resource that needs to be transmitted and a PSFCH resource that needs to be received exist on a transmission occasion of the target PSFCH, where the second terminal does not have a capability of performing transmission and reception at the same time, and the second terminal determines to perform transmission of the target PSFCH. To be specific, the second terminal needs to both transmit a PSFCH and receive a PSFCH at a same transmission occasion, and the second terminal does not have the capability of performing transmission and reception at the same time. However, if the second terminal determines to perform the transmission of the target PSFCH, and discard the reception of the target PSFCH, it is determined that the target feedback information is unable to be received.

In a possible implementation, the in a case of determining that target feedback information of a first terminal is unable to be received through a target PSFCH, the second terminal determining that feedback information of the first terminal is negative-acknowledgement feedback information includes: in a case of determining that the target feedback information of the first terminal is unable to be received through the target PSFCH, the second terminal determining that the feedback information of the first terminal is the negative-acknowledgement feedback information based on one of the following: protocol prescription, configuration by a network side, and configuration by the first terminal. To be specific, in the case of determining that the target feedback information of the first terminal is unable to be received through the target PSFCH, the second terminal may determine that the feedback information of the first terminal is the negative-acknowledgement feedback information based on the protocol prescription, the configuration by the network side (for example, a base station), or the configuration by the first terminal.

In this embodiment of this application, during groupcast between the second terminal and a plurality of first terminals, when determining the target feedback information of the first terminal, if the second terminal cannot receive the target feedback information of the first terminal through the target PSFCH, the second terminal determines that the feedback information of the first terminal is the negative-acknowledgement feedback information. The first terminal may use a feedback manner of negative-positive acknowledgement, or may use a feedback manner of negative-only acknowledgement.

S412: The second terminal performs retransmission to the first terminal.

In a possible implementation, the second terminal may perform retransmission on a retransmission resource outside the running duration of the first timer of the first terminal, or perform retransmission on a periodically reserved retransmission resource, or perform the retransmission on the retransmission resource outside the running duration of the first timer of the first terminal and the retransmission on the periodically reserved retransmission resource at the same time.

For example, the second terminal may generate a retransmission, and ensure that retransmission resources are not in a slot corresponding to the running duration of the first timer of RX UE (namely, the first terminal) (for example, positions of these transmission resources are excluded from optional transmission resources of TX UE during resource selection or reselection). If a position of a feedback resource is in a slot A, and the number of slots corresponding to the first timer is X (where ms may be converted to the number of slots or directly configured as the number of slots), the TX UE (namely, the second terminal) does not select X slots after the slot A as optional transmission resources.

The first timer is the same as the first timer in the method 200. Refer to the related descriptions in the method 200, and details are not described herein again.

In a possible implementation, during retransmission, the second terminal may determine whether the number of retransmissions exceeds a first threshold, and if yes, the retransmission is stopped, otherwise, the retransmission is performed once.

In the foregoing possible implementation, optionally, the first threshold is the same as a second threshold, and the second threshold is a maximum number of retransmissions configured for the second terminal in a case that the feedback information of the first terminal is able to be successfully received.

In the foregoing possible implementation, optionally, the first threshold is different from a second threshold, and the second threshold is a maximum number of retransmissions configured for the second terminal in a case that the feedback information of the first terminal is able to be successfully received.

In the foregoing technical solution, when the target feedback information transmitted by the first terminal needs to be received, if the second terminal (namely, a transmit terminal of data or control signaling) determines that the target feedback information is unable to be received through the target PSFCH, the second terminal the performs retransmission. Therefore, in a case that the second terminal cannot receive a feedback, a corresponding retransmission solution is determined, so that a HARQ feedback mechanism can adapt to a sidelink DRX configuration.

The foregoing data retransmission control method provided in this embodiment of this application provides a determination on retransmission by the TX UE when a PSFCH cannot be successfully received.

For example, for the TX UE, when at least one of the following cases occurs, the TX UE determines that the PSFCH receives NACK, and retransmission needs to be performed.

(1) Reception of the PSFCH conflicts with UL transmission, and the UE cannot simultaneously perform the reception of the PSFCH and the UL transmission. After a corresponding determination according to a priority comparison rule, the UL transmission needs to be prioritized.

(2) When the number of PSFCHs that need to be received exceeds the number of PSFCHs that are able to be received by a user, the PSFCH cannot be received.

(3) On a same PSFCH transmission occasion, the UE may have both a PSFCH resource that needs to be transmitted and a PSFCH resource that needs to be received. However, due to a problem of half-duplex of the UE (that is, transmission and reception cannot be performed at the same time), transmission of the PSFCH is performed in stead of the reception of the PSFCH.

In the foregoing embodiment, a feedback manner of negative-positive acknowledgment of groupcast may be used between the TX UE and the RX UE, or a feedback manner of negative-only acknowledgment of the groupcast may be used between the TX UE and the RX UE.

After the TX UE determines that the PSFCH receives NACK, the TX UE may perform at least one of the following actions.

(1) A retransmission is generated, and it is ensured that retransmission resources are not in a slot corresponding to a running duration of drx-HARQ-RTT-TimerSL of the RX UE (for example, positions of these transmission resources are excluded from optional transmission resources of the TX UE during resource selection or reselection). A determination method is that if a position of a feedback resource is in a slot A, and the number of slots corresponding to HARQ RTT timer is X (where ms may be converted to the number of slots or directly configured as the number of slots), in X slots after the slot A, the TX UE does not select these slots as optional transmission resources.

(2) Retransmission is performed at a periodically reserved retransmission resource.

The TX UE determines that the PSFCH receives NACK, and performs retransmission. Whether the TX UE performs such actions may be determined based on a protocol prescription or a configuration by a base station or peer UE.

Optionally, when the TX UE determines NACK because the TX UE fails to receive the PSFCH and then performs retransmission, and the number of retransmissions reaches a specific number (for example, exceeding the first threshold), the TX UE no longer performs the retransmission. The first threshold may be the same as or different from a maximum number of retransmissions normally configured for the TX UE.

Figure 5:
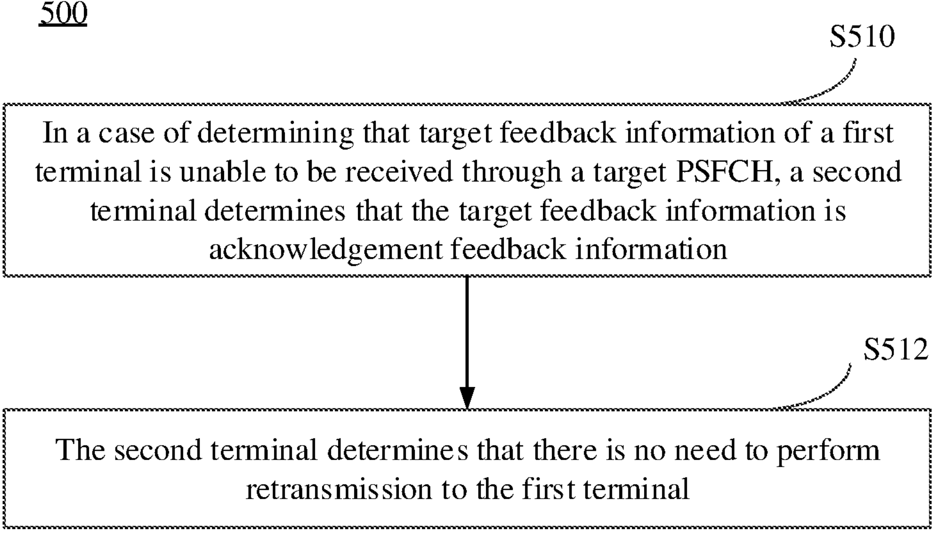
FIG. 5 is another schematic flowchart of a data retransmission control method according to an embodiment of this application.

FIG. 5 is another schematic flowchart of a data retransmission control method according to an embodiment of this application. The method 500 may be performed by a second terminal. In other words, the method may be performed by software or hardware installed on the second terminal. As shown in FIG. 5, the method may include the following steps.

S510: In a case of determining that target feedback information of a first terminal is unable to be received through a target PSFCH, the second terminal determines that the target feedback information is acknowledgement feedback information, where the first terminal communicates with the second terminal through a sidelink.

A difference between S510 and S410 in the method 400 is that in a case that it is determined that the target feedback information of the first terminal is unable to be received through the target PSFCH, the target feedback information is determined to be the acknowledgment feedback information in S510, while the target feedback information is determined to be the negative-acknowledgement feedback information in S410. The rest of S510 is the same as or similar to step S410 in the method 400. Refer to the descriptions of S410, and details are not described herein again.

In a possible implementation, the in a case of determining that target feedback information of a first terminal is unable to be received through a target PSFCH, the second terminal determining that the target feedback information is acknowledgement feedback information includes: in a case of determining that the target feedback information of the first terminal is unable to be received through the target PSFCH the second terminal determining that the target feedback information is the acknowledgement feedback information based on one of the following: protocol prescription, configuration by a network side, and configuration by the first terminal.

S512: The second terminal determines that there is no need to perform retransmission to the first terminal.

In the foregoing technical solution provided in this embodiment of this application, when the target feedback information transmitted by the first terminal needs to be received, if the second terminal (namely, a transmit terminal of data or control signaling) determines that the target feedback information is unable to be received through the target PSFCH, the second terminal considers that the target feedback information transmitted by the first terminal is the acknowledgment feedback information, and does not perform the retransmission. Therefore, in a case that the second terminal cannot receive a feedback, a corresponding retransmission solution is determined, so that a HARQ feedback mechanism can adapt to a sidelink DRX configuration.

It should be noted that the timer control method provided in the embodiments of this application may be performed by a timer control apparatus, or a control module configured to perform the timer control method in the timer control apparatus. In the embodiments of this application, the timer control apparatus provided in the embodiments of this application is described by using an example in which the timer control apparatus performs the timer control method.

A timer control apparatus is provided in an embodiment of this application. The apparatus may include a first timer control module, configured to: in a case of an occasion for determining that target feedback information needs to be transmitted to a second terminal and the target feedback information being unable to be transmitted through a target physical sidelink feedback channel PSFCH, start a first timer of a first terminal; where in a running duration of the first timer, the first terminal does not need to monitor control signaling and/or data from the second terminal; and the first terminal communicates with the second terminal through a sidelink.

To be specific, in this embodiment of this application, at an occasion of which the first terminal transmits the target feedback information to the second terminal, if the target feedback information is unable to be transmitted through the target PSFCH, the first timer control module starts the first timer in a processing manner of successfully transmitting negative-acknowledgement feedback information. A start time of the first timer is the same as an original start time for successfully transmitting the negative-acknowledgement feedback information. That is, although the target feedback information is unable to be transmitted in this case, the first timer is started in the manner of successfully transmitting the negative-acknowledgement feedback information, that is, the first timer is started at a predetermined moment after the negative-acknowledgement feedback information is successfully transmitted.

In application, in a case that the target feedback information needs to be transmitted to the second terminal, the first timer control module may determine whether the target feedback information is unable to be transmitted through the target PSFCH, and start the first timer when determining that the target feedback information is unable to be transmitted through the target PSFCH. Therefore, optionally, in a possible implementation, the first timer control module may include a first determining module 601 and a first control module 602, that is, as shown in FIG. 6, the possible timer control apparatus 600 may include the first determining module 601 and the first control module 602.

Figure 6:
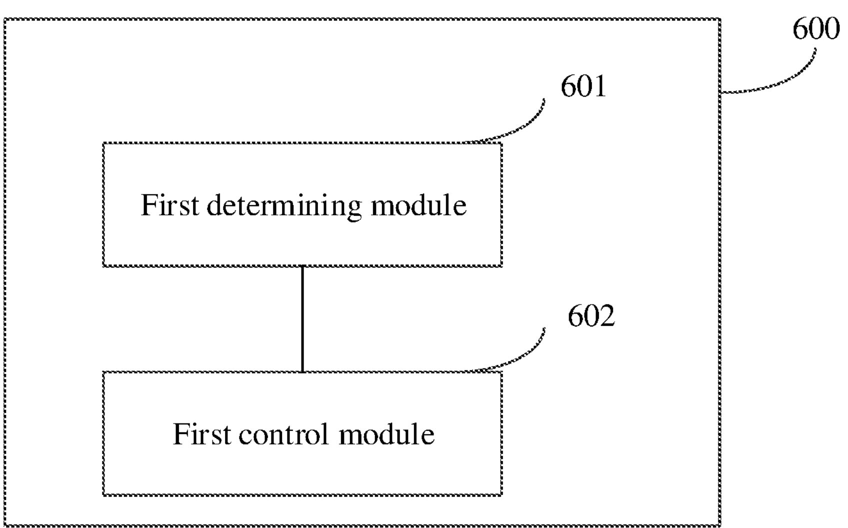
FIG. 6 is a schematic structural diagram of a timer control apparatus according to an embodiment of this application.

FIG. 6 is a schematic structural diagram of a timer control apparatus according to an embodiment of this application. As shown in FIG. 6, the apparatus 600 mainly includes the first determining module 601 and the first control module 602.

In this embodiment of this application, the first determining module 601 is configured to: in a case that a first terminal needs to transmit target feedback information to a second terminal, determine that the target feedback information is unable to be transmitted through a target physical sidelink feedback channel PSFCH, where the first terminal communicates with the second terminal through a sidelink. The first control module 602 is configured to start a first timer of the first terminal, where in a running duration of the first timer, the first terminal does not need to monitor control signaling and/or data from the second terminal.

In a possible implementation, duration of the first timer is determined in one of the following manners: being configured by a network side, being configured by the second terminal, and being specified by a protocol.

In a possible implementation, duration of the first timer is a minimum time gap from a feedback moment to reception of corresponding retransmission information.

In a possible implementation, the target feedback information includes acknowledgement feedback information or negative-acknowledgement feedback information.

In a possible implementation, the first determining module 601 determining that the target feedback information is unable to be transmitted through a target physical sidelink feedback channel PSFCH includes at least one of the following:

- determining that transmission of the target PSFCH conflicts with uplink transmission of the first terminal, where the first terminal is unable to simultaneously perform the transmission of the PSFCH and the uplink transmission, and the uplink transmission is determined to be prioritized according to a predetermined priority rule;
- determining that under an influence of a first factor, transmission through the target PSFCH is unable to be completed;
- determining that transmission of the target PSFCH is discarded;
- determining that transmission of the target PSFCH reaches a maximum number of times;

determining that transmission of the target PSFCH does not meet packet delay budget PDB; and determining that a distance between the first terminal and the second terminal exceeds a communication range indicated in sidelink control information, where communication between the first terminal and the second terminal is groupcast communication.

In a possible implementation, the first determining module 601 determining that the transmission on the target PSFCH is discarded includes at least one of the following:

in a case that the number of PSFCHs that need to be transmitted exceeds a maximum number of PSFCHs that are able to be transmitted by the first terminal, determining that the transmission on the target PSFCH is discarded; and in a case that both a PSFCH resource that needs to be transmitted and a PSFCH resource that needs to be received exist on a transmission occasion of the target PSFCH, the first terminal does not have a capability of performing transmission and reception at the same time, and the first terminal determines to receive the target PSFCH, determining that the transmission on the target PSFCH is discarded.

In a possible implementation, the first factor includes one of the following: limited power of the first terminal, congestion control, and resource unavailability of the target PSFCH.

The timer control apparatus in the embodiments of this application may be an apparatus, or may be a component, an integrated circuit, or a chip in a terminal. The apparatus may be a mobile terminal or a non-mobile terminal. For example, the mobile terminal may include but is not limited to the types of the terminal listed above, and the non-mobile terminal may be a server, a network attached storage (NAS), a personal computer (PC), a television (TV), a teller machine, a self-service machine, or the like, which is not specifically limited in the embodiments of this application.

The timer control apparatus in the embodiments of this application may be an apparatus with an operating system. The operating system may be an Android operating system, may be an iOS operating system, or may be another possible operating system, which is not specifically limited in the embodiments of this application.

The timer control apparatus 600 provided in this embodiment of this application can implement the processes that are implemented in the method embodiments of FIG. 2, with the same technical effects achieved. To avoid repetition, details are not described herein again.

A timer control apparatus is provided in an embodiment of this application. The apparatus may include a second timer control module, configured to: in a case of an occasion for determining that target feedback information needs to be transmitted to a second terminal and the target feedback information being unable to be transmitted through a target physical sidelink feedback channel PSFCH, prohibit starting a first timer of a first terminal; where in a running duration of the first timer, the first terminal does not need to monitor control signaling and/or data from the second terminal; and the first terminal communicates with the second terminal through a sidelink.

To be specific, in this embodiment of this application, at an occasion of which the first terminal transmits the target feedback information to the second terminal, if the target feedback information is unable to be transmitted through the target PSFCH, a second timer control module prohibits, in a processing manner of successfully transmitting acknowledgement feedback information, starting the first timer of the first terminal. That is, although the target feedback information is unable to be transmitted in this case, process is performed in the manner of successfully transmitting the acknowledgement feedback information.

In application, in a case that the first terminal needs to transmit the target feedback information to the second terminal, the second timer control module may determine whether the target feedback information is unable to be transmitted through the target PSFCH, and prohibit starting the first timer when determining that the target feedback information is unable to be transmitted through the target PSFCH. Therefore, optionally, in a possible implementation, the second timer control module may include a second determining module 701 and a second control module 702, that is, as shown in FIG. 7, the possible timer control apparatus may include the second determining module 701 and the second control module 702.

Figure 7:
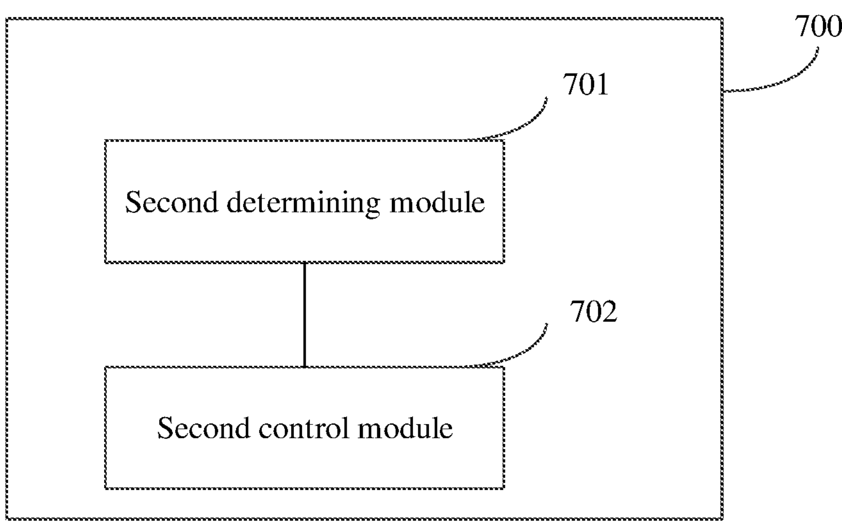
FIG. 7 is another schematic structural diagram of a timer control apparatus according to an embodiment of this application.

FIG. 7 is another schematic structural diagram of a timer control apparatus according to an embodiment of this application. As shown in FIG. 7, the apparatus 700 mainly includes the second determining module 701 and the second control module 702.

In this embodiment of this application, the second determining module 701 is configured to: in a case that a first terminal needs to transmit target feedback information to a second terminal, determine that the target feedback information is unable to be transmitted through a target physical sidelink feedback channel PSFCH, where the first terminal communicates with the second terminal through a sidelink. The second control module 702 is configured to prohibit starting a first timer of the first terminal, where in a running duration of the first timer, the first terminal does not need to monitor control signaling and/or data from the second terminal.

In a possible implementation, duration of the first timer is determined in one of the following manners: being configured by a network side, being configured by the second terminal, and being specified by a protocol.

In a possible implementation, duration of the first timer is a minimum time gap from a feedback moment to reception of corresponding retransmission information.

In a possible implementation, the target feedback information includes acknowledgement feedback information or negative-acknowledgement feedback information.

In a possible implementation, the second determining module 701 determining that the target feedback information is unable to be transmitted through the target physical sidelink feedback channel PSFCH includes at least one of the following:

determining that transmission of the target PSFCH conflicts with uplink transmission of the first terminal, where the first terminal is unable to simultaneously perform the transmission of the PSFCH and the uplink transmission, and the uplink transmission is determined to be prioritized according to a predetermined priority rule;

determining that under an influence of a first factor, transmission through the target PSFCH is unable to be completed;

determining that transmission of the target PSFCH is discarded;

determining that transmission of the target PSFCH reaches a maximum number of times;

determining that transmission of the target PSFCH does not meet packet delay budget PDB; and determining that a distance between the first terminal and the second terminal exceeds a communication range indicated in sidelink control information, where communication between the first terminal and the second terminal is groupcast communication.

In a possible implementation, the second determining module 701 determining that the transmission on the target PSFCH is discarded includes at least one of the following:

in a case that the number of PSFCHs that need to be transmitted exceeds a maximum number of PSFCHs that are able to be transmitted by the first terminal, determining that the transmission on the target PSFCH is discarded; and in a case that both a PSFCH resource that needs to be transmitted and a PSFCH resource that needs to be received exist on a transmission occasion of the target PSFCH, the first terminal does not have a capability of performing transmission and reception at the same time, and the first terminal determines to receive the target PSFCH, determining that the transmission on the target PSFCH is discarded.

In a possible implementation, the first factor includes one of the following: limited power of the first terminal, congestion control, and resource unavailability of the target PSFCH.

A timer control apparatus 700 provided in an embodiment of this application can implement the processes that are implemented in the method embodiments of FIG. 3, with the same technical effects achieved. To avoid repetition, details are not described herein again.

It should be noted that the data retransmission control method provided in the embodiments of this application may be performed by a data retransmission control apparatus, or a control module configured to perform the data retransmission control method in the data retransmission control apparatus. In the embodiments of this application, the data retransmission control apparatus provided in the embodiments of this application is described by using an example in which the data retransmission control apparatus performs the data retransmission control method.

Figure 8:
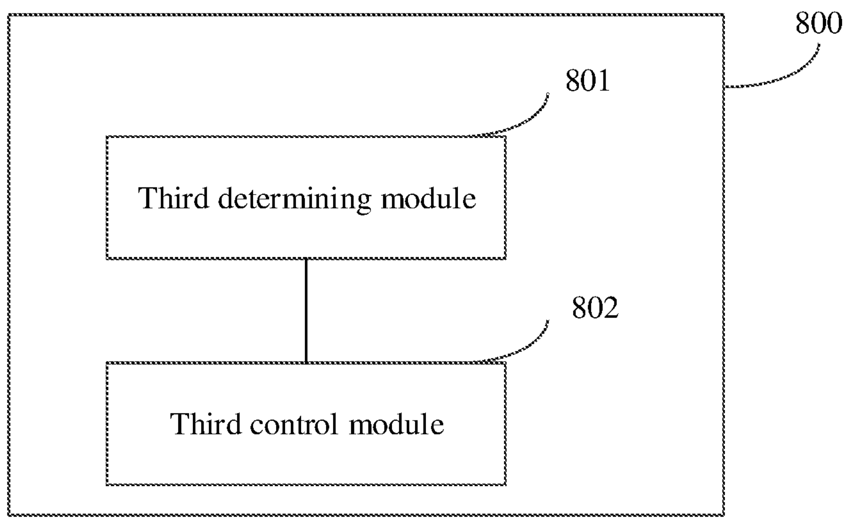
FIG. 8 is a schematic structural diagram of a data retransmission control apparatus according to an embodiment of this application.

FIG. 8 is a schematic structural diagram of a data retransmission control apparatus according to an embodiment of this application. As shown in FIG. 8, the apparatus 800 mainly includes a third determining module 801 and a third control module 802.

In this embodiment of this application, the third determining module 801 is configured to: in a case of determining that a second terminal is unable to receive target feedback information of a first terminal through a target PSFCH, determine that feedback information of the first terminal is negative-acknowledgement feedback information, where the first terminal communicates with the second terminal through a sidelink; and the third control module 802 is configured to perform retransmission to the first terminal.

In a possible implementation, the third determining module 801 determining that the second terminal is unable to receive the target feedback information of the first terminal through the target PSFCH includes one of the following:

determining that reception of the target PSFCH conflicts with uplink transmission of the second terminal, where the second terminal is unable to simultaneously perform the reception of the PSFCH and the uplink transmission, and the uplink transmission is determined to be prioritized according to a predetermined priority rule;

determining that the number of PSFCHs that need to be received exceeds a maximum number of PSFCHs that are able to be received by the second terminal, where reception through the target PSFCH is unable to be performed; and determining that both a PSFCH resource that needs to be transmitted and a PSFCH resource that needs to be received exist on a transmission occasion of the target PSFCH, where the second terminal does not have a capability of performing transmission and reception at the same time, and the second terminal determines to perform transmission of the target PSFCH.

In a possible implementation, the third control module 802 performing the retransmission to the first terminal includes:

performing retransmission on a retransmission resource; where the retransmission resource is outside a running duration of a first timer of the first terminal; and/or the retransmission resource is a periodically reserved retransmission resource; where in the running duration of the first timer, the first terminal does not need to monitor data from the second terminal.

In a possible implementation, the in a case of determining that the target feedback information of the first terminal is unable to be received through the target PSFCH, the third determining module 801 determining that the feedback information of the first terminal is the negative-acknowledgement feedback information includes:

in a case of determining that the target feedback information of the first terminal is unable to be received through the target PSFCH, determining that the feedback information of the first terminal is the negative-acknowledgement feedback information based on one of the following: protocol prescription, configuration by a network side, and configuration by the first terminal.

In a possible implementation, the third control module 802 performing the retransmission to the first terminal includes:

determining whether the number of retransmissions exceeds a first threshold; and if yes, stopping the retransmission, otherwise, performing the retransmission once.

In a possible implementation, the first threshold is the same as a second threshold, and the second threshold is a maximum number of retransmissions configured for the second terminal in a case that the feedback information of the first terminal is able to be successfully received.

In a possible implementation, the first threshold is different from a second threshold, and the second threshold is a maximum number of retransmissions configured for the second terminal in a case that the feedback information of the first terminal is able to be successfully received.

The data retransmission control apparatus in the embodiments of this application may be an apparatus, or may be a component, an integrated circuit, or a chip in a terminal. The apparatus may be a mobile terminal or a non-mobile terminal. For example, the mobile terminal may include but is not limited to the types of the terminal listed above, and the non-mobile terminal may be a server, a network attached storage (NAS), a personal computer (PC), a television (TV), a teller machine, a self-service machine, or the like, which is not specifically limited in the embodiments of this application.

The data retransmission control apparatus in the embodiments of this application may be an apparatus with an operating system. The operating system may be an Android operating system, may be an iOS operating system, or may be another possible operating system, which is not specifically limited in the embodiments of this application.

A data retransmission control apparatus 800 provided in an embodiment of this application can implement the processes that are implemented in the method embodiments of FIG. 4, with the same technical effects achieved. To avoid repetition, details are not described herein again.

Figure 9:
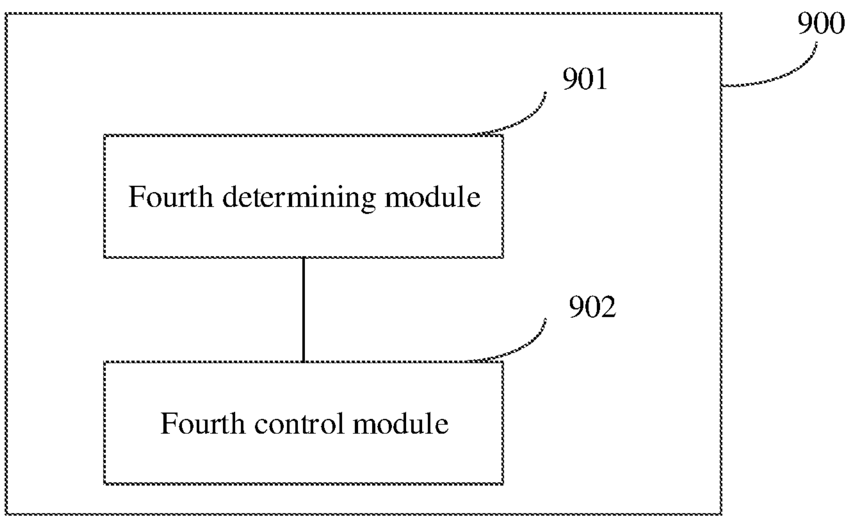
FIG. 9 is another schematic structural diagram of a data retransmission control apparatus according to an embodiment of this application.

FIG. 9 is another schematic structural diagram of a data retransmission control apparatus according to an embodiment of this application. As shown in FIG. 9, the apparatus 900 mainly includes a fourth determining module 901 and a fourth control module 902.

In this embodiment of this application, the fourth determining module 901 is configured to: in a case of determining that a second terminal is unable to receive target feedback information of a first terminal through a target PSFCH, determine that feedback information of the first terminal is negative-acknowledgement feedback information, where the first terminal communicates with the second terminal through a sidelink; and the fourth control module 902 is configured to determine that there is no need to perform retransmission to the first terminal.

In a possible implementation, the fourth determining module 901 determining that the second terminal is unable to receive the target feedback information of the first terminal through the target PSFCH includes one of the following:

determining that reception of the target PSFCH conflicts with uplink transmission of the second terminal, where the second terminal is unable to simultaneously perform the reception of the PSFCH and the uplink transmission, and the uplink transmission is determined to be prioritized according to a predetermined priority rule;

determining that the number of PSFCHs that need to be received exceeds a maximum number of PSFCHs that are able to be received by the second terminal, where reception through the target PSFCH is unable to be performed; and determining that both a PSFCH resource that needs to be transmitted and a PSFCH resource that needs to be received exist on a transmission occasion of the target PSFCH, where the second terminal does not have a capability of performing transmission and reception at the same time, and the second terminal determines to perform transmission of the target PSFCH.

In a possible implementation, the in a case of determining that the target feedback information of the first terminal is unable to be received through the target PSFCH, the fourth determining module 901 determining that the feedback information of the first terminal is the negative-acknowledgement feedback information includes:

in a case of determining that the target feedback information of the first terminal is unable to be received through the target PSFCH, determining that the feedback information of the first terminal is the negative-acknowledgement feedback information based on one of the following: protocol prescription, configuration by a network side, and configuration by the first terminal.

A data retransmission control apparatus 900 provided in an embodiment of this application can implement the processes that are implemented in the method embodiments of FIG. 5, with the same technical effects achieved. To avoid repetition, details are not described herein again.

Figure 10:
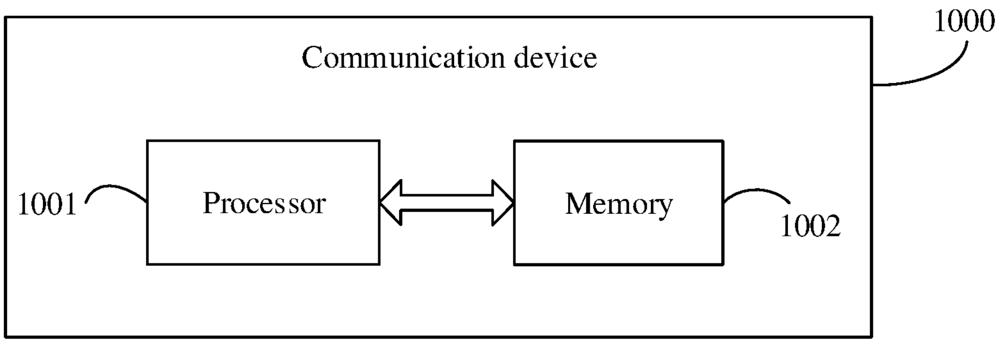
FIG. 10 is a schematic structural diagram of a communication device according to an embodiment of this application.

Optionally, as shown in FIG. 10, an embodiment of this application further provides a communication device 1000, including a processor 1001, a memory 1002, and a program or instructions stored in the memory 1002 and executable on the processor 1001. For example, if the communication device 1000 is a terminal, when the program or instructions are executed by the processor 1001, the processes of the foregoing embodiments of the timer control method are implemented, with the same technical effects achieved. Alternatively, when the program or instructions are executed by the processor 1001, the processes of the foregoing embodiments of the data retransmission control method are implemented, with the same technical effects achieved. To avoid repetition, details are not described herein again.

Figure 11:
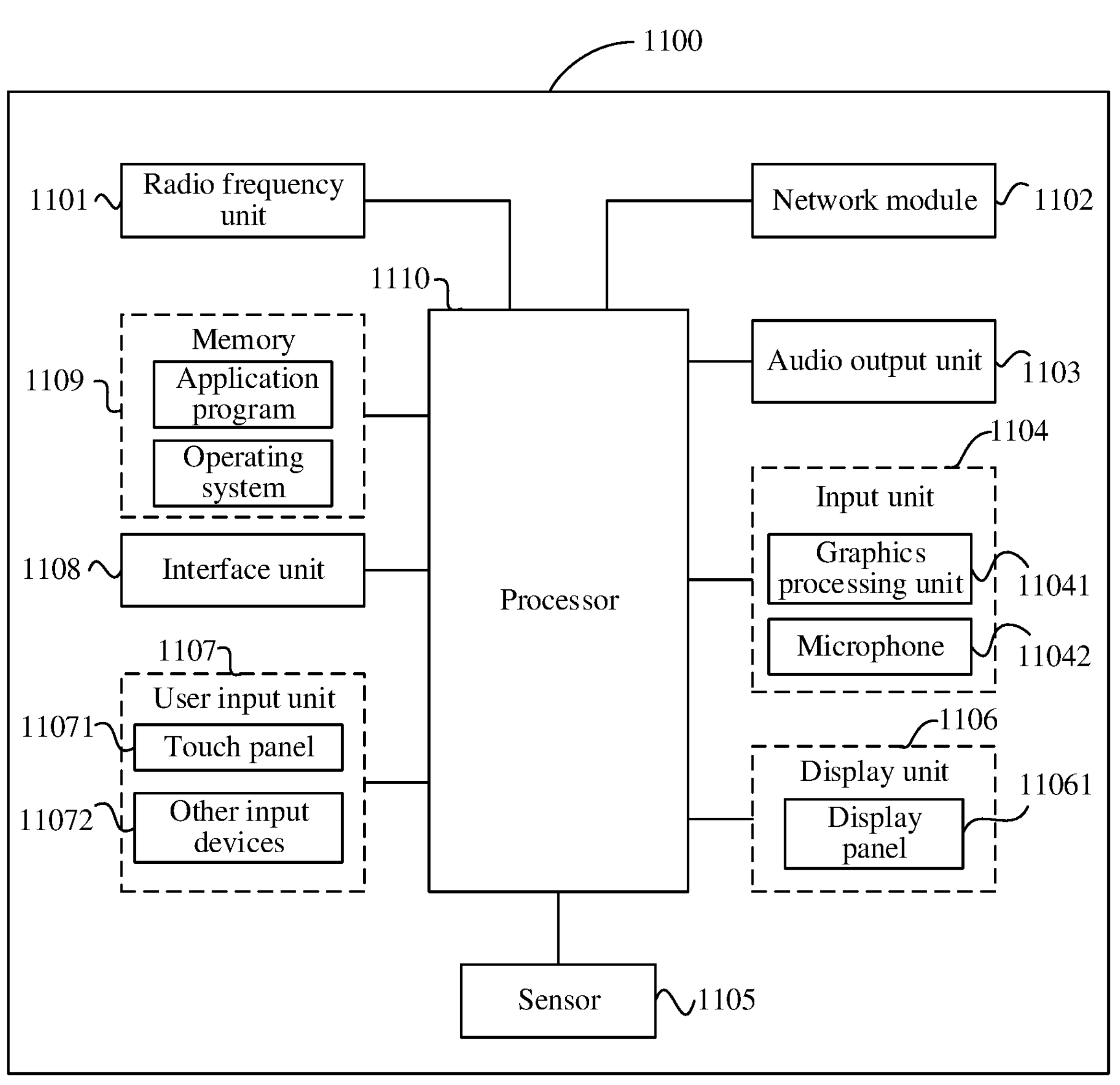
FIG. 11 is a schematic diagram of a hardware structure of a terminal according to an embodiment of this application.

FIG. 11 is a schematic diagram of a hardware structure of a terminal for implementing the embodiments of this application.

The terminal 1100 includes but is not limited to components such as a radio frequency unit 1101, a network module 1102, an audio output unit 1103, an input unit 1104, a sensor 1105, a display unit 1106, a user input unit 1107, an interface unit 1108, a memory 1109, and a processor 1110.

Persons skilled in the art can understand that the terminal 1100 may further include a power supply (for example, a battery) for supplying power to the components. The power supply may be logically connected to the processor 1110 via a power management system. In this way, functions such as charge management, discharge management, and power consumption management are implemented via the power management system. The terminal structure shown in FIG. 11 does not constitute any limitation on the terminal. The terminal may include more or fewer components than shown in the figure, or combine some of the components, or have the components arranged differently, which are not further described herein.

It should be understood that in this embodiment of this application, the input unit 1104 may include a graphics processing unit (GPU) 11041 and a microphone 11042. The graphics processing unit 11041 processes image data of a static picture or a video obtained by an image capture apparatus (for example, a camera) in a video capture mode or an image capture mode. The display unit 1106 may include a display panel 11061. The display panel 11061 may be configured in a form of a liquid crystal display, an organic light-emitting diode, or the like. The user input unit 1107 includes a touch panel 11071 and other input devices 11072. The touch panel 11071 is also referred to as a touchscreen. The touch panel 11071 may include two parts: a touch detection apparatus and a touch controller. The other input devices 11072 may include but are not limited to a physical keyboard, a functional key (such as a volume control key or a power on/off key), a trackball, a mouse, and a joystick. Details are not described herein.

In the embodiments of this application, the radio frequency unit 1101 transmits downlink data received from a network-side device to the processor 1110 for processing, and in addition, transmits uplink data to the network-side device. Generally, the radio frequency unit 1101 includes but is not limited to an antenna, at least one amplifier, a transceiver, a coupler, a low noise amplifier, and a duplexer.

The memory 1109 may be configured to store software programs or instructions and various data. The memory 1109 may mainly include a program or instruction storage area and a data storage area. The program or instruction storage area may store an operating system, an application program or instructions required by at least one function (for example, a sound playback function and an image playback function), and the like. In addition, the memory 1109 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or other non-volatile solid-state storage devices.

The processor 1110 may include one or more processing units. Optionally, the processor 1110 may integrate an application processor and a modem processor. The application processor mainly processes an operating system, a user interface, an application program or instructions, and the like. The modem processor mainly processes wireless communication, for example, a baseband processor. It can be understood that the modem processor may alternatively be not integrated into the processor 1110.

The processor 1110 is configured to:

in a case of an occasion for determining that a first terminal needs to transmit target feedback information to a second terminal and the target feedback information being unable to be transmitted through a target PSFCH, start a first timer of the first terminal; where in a running duration of the first timer, the first terminal does not need to monitor control signaling and/or data from the second terminal; and the first terminal communicates with the second terminal through a sidelink.

Alternatively, the processor 1110 is configured to:

in a case of an occasion for determining that a first terminal needs to transmit target feedback information to a second terminal and the target feedback information being unable to be transmitted through a target PSFCH, prohibit starting a first timer of the first terminal; where in a running duration of the first timer, the first terminal does not need to monitor control signaling and/or data from the second terminal; and the first terminal communicates with the second terminal through a sidelink.

Alternatively, the processor 1110 is configured to:

in a case of determining that a second terminal is unable to receive target feedback information of a first terminal through a target PSFCH, determine that feedback information of the first terminal is negative-acknowledgement feedback information, where the first terminal communicates with the second terminal through a sidelink; and perform retransmission to the first terminal.

Alternatively, the processor 1110 is configured to:

in a case of determining that a second terminal is unable to receive target feedback information of a first terminal through a target PSFCH, determine that the target feedback information is acknowledgement feedback information, where the first terminal communicates with the second terminal through a sidelink; and determine that there is no need to perform retransmission to the first terminal.

In a case that the target feedback information needs to be transmitted to the second terminal, if it is determined that the target feedback information is unable to be transmitted through the target PSFCH, the terminal provided in the embodiments of this application starts or prohibits starting the first timer. Alternatively, when the target feedback information transmitted by the first terminal needs to be received, if the second terminal (namely, a transmit terminal of data or control signaling) determines that the target feedback information is unable to be received through the target PSFCH, the second terminal the performs retransmission or does not perform retransmission. In this way, in a case that the first terminal is unable to transmit a feedback, a start solution of the first timer related to a sidelink DRX configuration is determined, so that a HARQ feedback mechanism can adapt to the sidelink DRX configuration, for performing retransmission control.

An embodiment of this application further provides a non-transitory readable storage medium. The non-transitory readable storage medium stores a program or instructions. When the program or instructions are executed by a processor, the processes of the foregoing embodiments of the timer control method are implemented, or the processes of the foregoing embodiments of the data retransmission control method are implemented, with the same technical effects achieved. To avoid repetition, details are not described herein again.

The processor is the processor in the terminal in the foregoing embodiments. The non-transitory readable storage medium includes a non-transitory computer-readable storage medium such as a computer read-only memory (ROM), a random access memory (RAM), a magnetic disk, or an optical disc.

An embodiment of this application further provides a chip. The chip includes a processor and a communication interface. The communication interface is coupled to the processor. The processor is configured to run a program or instructions of a network-side device to implement the processes of the foregoing embodiments of the timer control method, or the processes of the foregoing embodiments of the data retransmission control method, with the same technical effects achieved. To avoid repetition, details are not described herein again.

An embodiment of this application further provides a computer program product. The computer program product includes a processor, a memory, and a program or instructions stored in the memory and executable on the processor. When the program or instructions are executed by the processor, the processes of the foregoing embodiments of the timer control method are implemented, or the processes of the foregoing embodiments of the data retransmission control method are implemented, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that in this specification, the terms “include”, “comprise”, or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more constraints, an element preceded by “includes a . . . ” does not preclude the presence of other identical elements in the process, method, article, or apparatus that includes the element. In addition, it should be noted that the scope of the method and apparatus in the implementations of this application is not limited to functions being performed in the order shown or discussed, but may further include functions being performed at substantially the same time or in a reverse order, depending on the functions involved. For example, the described method may be performed in an order different from the order described, and steps may be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially, or the part contributing to the prior art may be implemented in a form of a computer software product. The computer software product is stored in a non-transitory storage medium (for example, a ROM/RAM, a magnetic disk, or an optical disc), and includes several instructions for instructing a terminal (which may be a mobile phone, a computer, a server, a network device, or the like) to perform the method described in the embodiments of this application.

The foregoing describes the embodiments of this application with reference to the accompanying drawings. However, this application is not limited to the foregoing implementations. The foregoing implementations are merely illustrative rather than restrictive. As instructed by this application, persons of ordinary skill in the art may develop many other forms without departing from the principle of this application and the protection scope of the claims, and all such forms fall within the protection scope of this application.

What is claimed is:

1. A timer control method, comprising:

in a case of an occasion for determining that target feedback information needs to be transmitted to a second terminal and the target feedback information being unable to be transmitted through a target physical sidelink feedback channel (PSFCH), starting or prohibiting, by a first terminal, a first timer; wherein in a running duration of the first timer, the first terminal does not need to monitor control signaling and/or data from the second terminal; and the first terminal communicates with the second terminal through a sidelink; wherein the target feedback information being unable to be transmitted through the target PSFCH comprises at least one of following:

under an influence of a first factor, the target PSFCH being unable to complete transmission;

transmission of the target PSFCH not meeting packet delay budget (PDB);

a distance between the first terminal and the second terminal exceeding a communication range indicated in sidelink control information, wherein communication between the first terminal and the second terminal is groupcast communication; wherein the first factor comprises one of following: limited power of the first terminal, congestion control, and resource unavailability of the target PSFCH.

2. The method according to claim 1, wherein duration of the first timer is a minimum time gap from a feedback moment to reception of corresponding retransmission information; or the target feedback information comprises acknowledgement feedback information or negative-acknowledgement feedback information.

3. The method according to claim 1, wherein the target feedback information being unable to be transmitted through the target PSFCH further comprises at least one of following:

transmission of the target PSFCH conflicting with uplink transmission of the first terminal, wherein the first terminal is unable to simultaneously perform the transmission of the PSFCH and the uplink transmission, and the uplink transmission is determined to be prioritized according to a predetermined priority rule;

transmission of the target PSFCH being discarded; and transmission of the target PSFCH reaching a maximum number of times.

4. The method according to claim 3, wherein the transmission on the target PSFCH being discarded comprises at least one of following:

in a case that the number of PSFCHs that need to be transmitted exceeds a maximum number of PSFCHs that are able to be transmitted by the first terminal, the transmission on the target PSFCH being discarded; and in a case that both a PSFCH resource that needs to be transmitted and a PSFCH resource that needs to be received exist on a transmission occasion of the target PSFCH, the first terminal does not have a capability of performing transmission and reception at the same time, and the first terminal determines to receive the target PSFCH, the transmission on the target PSFCH being discarded.

5. A data retransmission control method, comprising:

in a case that a second terminal determines that target feedback information of a first terminal is unable to be received through a target physical sidelink feedback channel (PSFCH), determining, by the second terminal, that feedback information of the first terminal is negative-acknowledgement feedback information; and performing, by the second terminal, retransmission to the first terminal; or in a case that a second terminal determines that target feedback information of a first terminal is unable to be received through a target PSFCH, determining, by the second terminal, that the target feedback information is acknowledgement feedback information; and determining, by the second terminal, that there is no need to perform retransmission to the first terminal; wherein the first terminal communicates with the second terminal through a sidelink; wherein the second terminal determining that the target feedback information of the first terminal is unable to be received through a target PSFCH comprises one of following:

determining that reception of the target PSFCH conflicts with uplink transmission of the second terminal, wherein the second terminal is unable to simultaneously perform the reception of the PSFCH and the uplink transmission, and the uplink transmission is determined to be prioritized according to a predetermined priority rule;

determining that the number of PSFCHs that need to be received exceeds a maximum number of PSFCHs that are able to be received by the second terminal, wherein reception through the target PSFCH is unable to be performed; and determining that both a PSFCH resource that needs to be transmitted and a PSFCH resource that needs to be received exist on a transmission occasion of the target PSFCH, wherein the second terminal does not have a capability of performing transmission and reception at the same time, and the second terminal determines to perform transmission of the target PSFCH.

6. The method according to claim 5, wherein the performing, by the second terminal, retransmission to the first terminal comprises:

performing, by the second terminal, retransmission on a retransmission resource; wherein the retransmission resource is outside a running duration of a first timer of the first terminal; and/or the retransmission resource is a periodically reserved retransmission resource; wherein in the running duration of the first timer, the first terminal does not need to monitor data from the second terminal.

7. The method according to claim 5, wherein the in a case that a second terminal determines that target feedback information of a first terminal is unable to be received through a target PSFCH, determining, by the second terminal, that feedback information of the first terminal is negative-acknowledgement feedback information comprises:

in a case that the second terminal determines that the target feedback information of the first terminal is unable to be received through the target PSFCH, determining, by the second terminal, that the feedback information of the first terminal is the negative-acknowledgement feedback information based on one of following: protocol prescription, configuration by a network side, and configuration by the first terminal.

8. The method according to claim 5, wherein the performing, by the second terminal, retransmission to the first terminal comprises:

determining whether the number of retransmissions exceeds a first threshold; and if yes, stopping the retransmission, otherwise, performing the retransmission once.

9. The method according to claim 8, wherein the first threshold is the same as a second threshold, and the second threshold is a maximum retransmission number configured for the second terminal in a case that the feedback information of the first terminal is able to be successfully received.

10. The method according to claim 8, wherein the first threshold is different from a second threshold, and the second threshold is a maximum number of retransmissions configured for the second terminal in a case that the feedback information of the first terminal is able to be successfully received.

11. The method according to claim 5, wherein the in a case that a second terminal determines that target feedback information of a first terminal is unable to be received through a target PSFCH, determining, by the second terminal, that the target feedback information is acknowledgement feedback information comprises:

in a case that the second terminal determines that the target feedback information of the first terminal is unable to be received through the target PSFCH, determining, by the second terminal, that the target feedback information is the acknowledgement feedback information based on one of following: protocol prescription, configuration by a network side, and configuration by the first terminal.

12. A terminal, comprising a processor, a memory, and a program or instructions stored in the memory and executable on the processor, wherein the program or instructions, when executed by the processor, causes the terminal to perform:

in a case of an occasion for determining that target feedback information needs to be transmitted to a second terminal and the target feedback information being unable to be transmitted through a target physical sidelink feedback channel (PSFCH), starting or prohibiting a first timer; wherein in a running duration of the first timer, the terminal does not need to monitor control signaling and/or data from the second terminal; and the terminal communicates with the second terminal through a sidelink; wherein the target feedback information being unable to be transmitted through the target PSFCH comprises at least one of following:

under an influence of a first factor, the target PSFCH being unable to complete transmission;

transmission of the target PSFCH not meeting packet delay budget (PDB);

a distance between the first terminal and the second terminal exceeding a communication range indicated in sidelink control information, wherein communication between the first terminal and the second terminal is groupcast communication; wherein the first factor comprises one of following: limited power of the first terminal, congestion control, and resource unavailability of the target PSFCH.

13. The terminal according to claim 12, wherein the target feedback information being unable to be transmitted through the target PSFCH further comprises at least one of following:

transmission of the target PSFCH conflicting with uplink transmission of the terminal, wherein the terminal is unable to simultaneously perform the transmission of the PSFCH and the uplink transmission, and the uplink transmission is determined to be prioritized according to a predetermined priority rule;

transmission of the target PSFCH being discarded; and transmission of the target PSFCH reaching a maximum number of times.

14. The terminal according to claim 13, wherein the transmission on the target PSFCH being discarded comprises at least one of following:

in a case that the number of PSFCHs that need to be transmitted exceeds a maximum number of PSFCHs that are able to be transmitted by the terminal, the transmission on the target PSFCH being discarded; and in a case that both a PSFCH resource that needs to be transmitted and a PSFCH resource that needs to be received exist on a transmission occasion of the target PSFCH, the terminal does not have a capability of performing transmission and reception at the same time, and the terminal determines to receive the target PSFCH, the transmission on the target PSFCH being discarded.

15. A terminal, comprising a processor, a memory, and a program or instructions stored in the memory and executable on the processor, wherein when the program or instructions are executed by the processor, steps of the data retransmission control method according to claim 5 are implemented.

* * * * *